United States Patent [19]

Yasuda et al.

[11] Patent Number: 5,901,365
[45] Date of Patent: * May 4, 1999

[54] COMMUNICATION TERMINAL DEVICE AND CALL ORIGINATING METHOD

[75] Inventors: Hiroshi Yasuda; Morihiko Hayashi, both of Kanagawa; Michihiro Kaneko, Tokyo; Michihito Nakagawa, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/568,645

[22] Filed: Dec. 7, 1995

[30] Foreign Application Priority Data

Dec. 19, 1994 [JP] Japan ..................... 6-335017

[51] Int. Cl.⁶ ...................................... H04Q 7/32
[52] U.S. Cl. .................. 455/564; 455/550; 455/412; 455/460
[58] Field of Search .................. 379/58, 59, 63, 379/354, 355, 356, 359, 216; 455/564, 550, 412, 566, 575, 403, 460

[56] References Cited

U.S. PATENT DOCUMENTS

| | | | |
|---|---|---|---|
| 4,885,762 | 12/1989 | Suzuki et al. | 379/58 |
| 5,247,565 | 9/1993 | Joglekar | 455/564 |
| 5,491,745 | 2/1996 | Roeder | 379/58 |
| 5,535,260 | 7/1996 | Zicker et al. | 379/58 |

FOREIGN PATENT DOCUMENTS

| | | |
|---|---|---|
| 5244243 | 9/1993 | Japan . |
| 5-183619 | 11/1993 | Japan . |
| 5-344195 | 3/1994 | Japan . |
| 2278756 | 12/1994 | United Kingdom . |

*Primary Examiner*—Wellington Chin
*Assistant Examiner*—Keith Ferguson
*Attorney, Agent, or Firm*—Jay H. Maioli

[57] ABSTRACT

In a communication terminal device and a method of originating a call, the number of operations at the time of originating a call in a communication terminal device can be reduced. When the send key is depressed for a long period after inputting a numerical sequence by the numeral keys, the call origination based on the input numerical sequence itself is performed. In contrast, when the send key is depressed for a short period after inputting a numerical sequence, the call origination based on the telephone number read from the storage address corresponding to the input numeral sequence is performed. In this manner, the originating operation as to the telephone number stored in the telephone directory memory can be performed by inputting a numeral sequence corresponding to the storage address and depressing the send key, and the originating operation as to an arbitrary special telephone number can be performed merely by inputting a numerical sequence and depressing the send key. Accordingly, the communication terminal device can be obtained which can reduce the number of operations at the time of originating a call and hence provide excellent operability.

4 Claims, 5 Drawing Sheets

5,901,365

COMMUNICATION TERMINAL DEVICE AND CALL ORIGINATING METHOD

BACKGROUND OF THE INVENTION

1. Field of the Invention

The present invention relates to a communication terminal device, and is applicable to, for example, a portable telephone (such as GSM·USDC·PDC), a digital cordless telephone (such as PHS·DECT·CT-2) or the like.

2. Description of the Related Art

At present, there are some telephones which are provided with such a function that, by merely inputting a designated number of one to three figures and depressing a send key, the origination operation can be performed automatically. A telephone number of a destination is read out from a memory area corresponding to the designated number and then the originating operation is performed based on the telephone number thus read. When such a function is employed, since the originating operation can be performed by operating keys four times at most, the originating operation is attained conveniently without inputting all of the long telephone number. Such a telephone is also provided with a function that the originating operation can be performed as to the specified special telephone numbers (for example, "O" (operator), "911" (police in the United States) by merely inputting a number corresponding thereto and depressing the send key.

However, since such a telephone is adapted to have this function as to only the specified special telephone numbers, the originating operation can not be performed by the minimum number of operation steps as to special telephone numbers other than the specified special telephone numbers.

SUMMARY OF THE INVENTION

In view of the foregoing, an object of the present invention is to provide a communication terminal device which is able to perform the originating operation by the minimum number of operation steps using a memory and also to originate a call as to an arbitrary special telephone number.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Configuration

Figure 1:
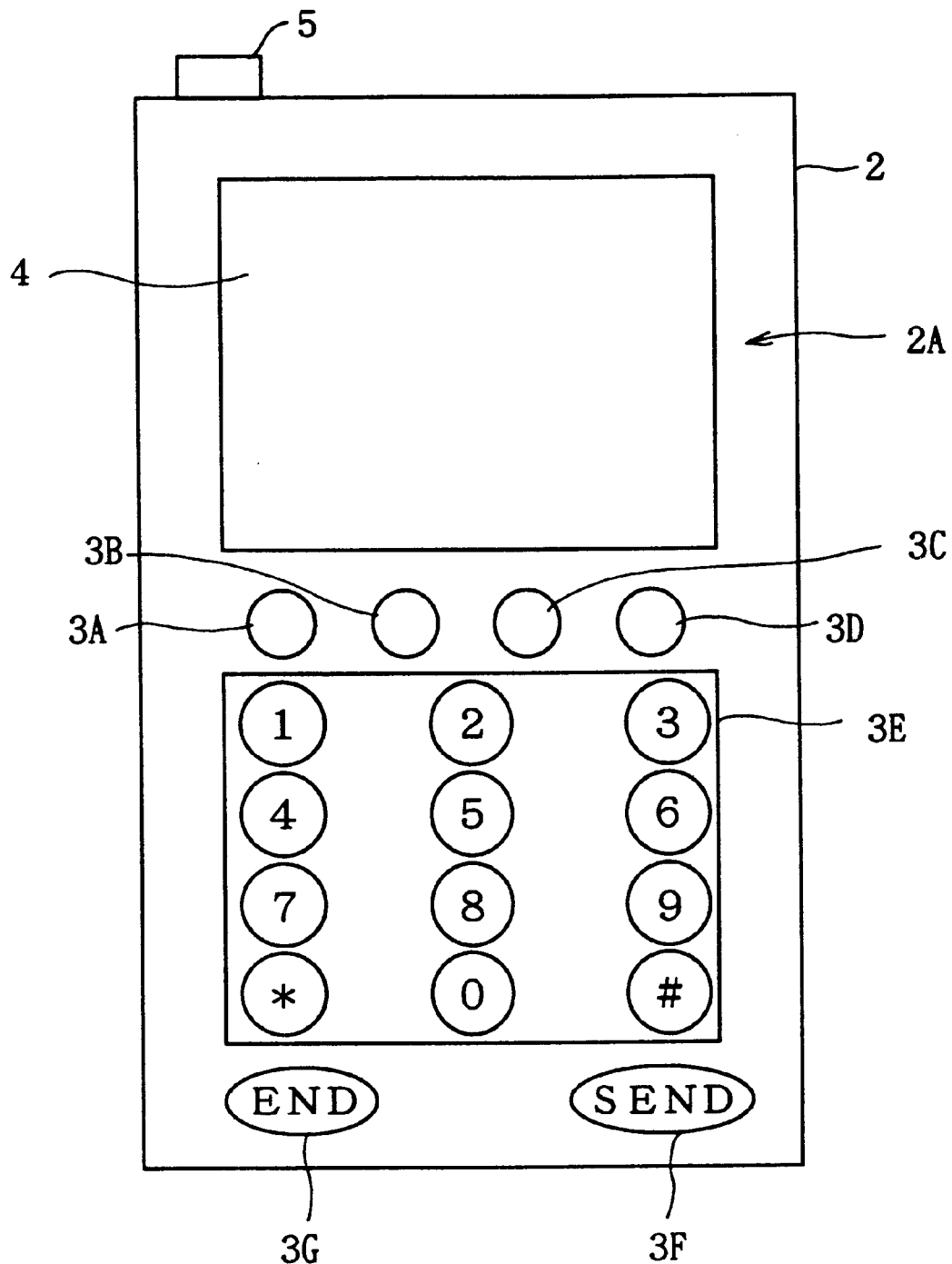
FIG. 1 is a front view showing an example of a communication terminal device according to the present invention.

In this embodiment, the explanation will be made as to a portable telephone which has realized a function of performing the originating operation by the minimum number of operation steps also as to an arbitrary special telephone number. FIG. 1 shows the external configuration of a portable telephone 1 according to the embodiment.

On a front panel 2A of a body 2 used in the embodiment, there are provided a display 4 for displaying a telephone number as well as operation keys 3 (that is, a power key 3A, a memory store key 3B, a memory recall key 3C, a clear key 3D, numeral keys 3E, a send key 3F, and an end key 3G). The display 4 is arranged to display a telephone number etc. input by a user so that the user is able to confirm the inputted content and select a mode on the display. The body 2 is further provided with an antenna 5 and a speaker/microphone portion 6 (not shown).

Figure 2:
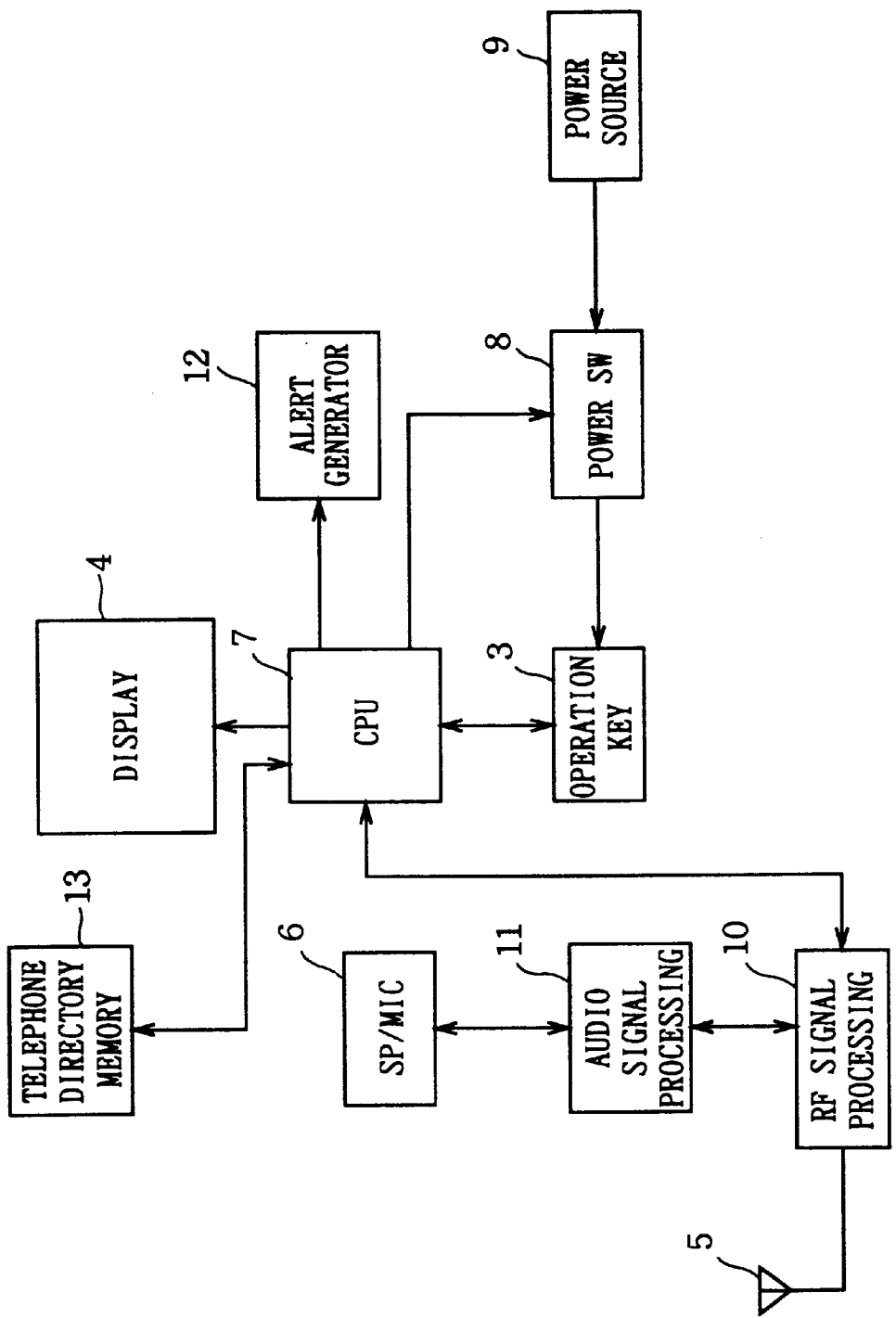
FIG. 2 is a block diagram showing an example of an internal circuit of the communication terminal device according to the present invention.

FIG. 2 shows the internal configuration of the portable telephone 1. The internal circuit of the portable telephone is configured to include a CPU 7 (control means) serving as a main part so that the CPU 7 controls other elements of the internal circuit. For example, in the case where the user depresses the power key 3A when the user wishes to originate a call, the CPU 7 controls the power switch 8 to close it so that power is supplied to the CPU 7 from the power source 9 and hence the CPU 7 is placed in a standby state waiting for various operations.

In this state, for example, when a user inputs a telephone number of the other party or a destination through the numeral keys 3E, the CPU 7 displays the input telephone number of the destination on the display 4. Then, when the user further depresses the send key 3F, the CPU 7 starts originating a call to the destination through a wireless portion 10 and the antenna 5.

When the destination responds to the call origination and conversation is started, a reception signal received by the antenna 5 is taken into a sound processing portion 11 through the wireless portion 10 and then subjected to signal processing and subsequently output by the speaker of the speaker/microphone portion 6. Further, voice of the user is applied to the signal processing portion 11 through the microphone of the speaker/microphone portion 6 and then transmitted from the antenna 5 through the wireless portion 10.

In contrast, when a call is transmitted to the portable telephone from another party, the CPU 7 detects the reception of the call and controls an alert sound generator 12 to generate an alert sound, whereby the user is able to know the reception of the call. In this state, when the send key 3F is depressed, the CPU 7 detects the depression of the send key and controls the circuit so as to start conversation and also stops the generation of the alert sound.

The portable telephone 1 is further provided with a telephone directory memory 13 which stores telephone numbers of destinations having been registered in advance so that a call can be originated to the destination by merely inputting a numeral of one to two figures corresponding to the destination. In this embodiment, the telephone directory memory 13 has storage addresses of "0" to "99" corresponding to one hundred destinations. The registration, calling and erasing of data in the telephone directory memory 13 is performed by operating the memory store key 3B, memory recall key 3C, and clear key 3D, respectively. When these keys are depressed, the CPU 7 performs the registration, calling and erasing of data to the actual telephone directory memory 13 corresponding to those keys.

In this embodiment, when the send key 3F to be depressed succeeding to the input of a numerical sequence is depressed for a period less than a predetermined period (for example, one second), the originating operation is performed based on a telephone number read from the storage address of the telephone directory memory 13 corresponding to the numerical sequence.

In contrast, when the send key 3F to be depressed succeeding to the input of a numerical sequence is depressed for the predetermined period or more, the originating operation is performed based on the numerical sequence input immediately before the depression of the send key by regarding it as a telephone number of a destination.

In this manner, since either the originating operation based on the telephone number read from the memory or the originating operation based on the numerical sequence input just before the depression of the send key is selected depending on the depression time period of the send key 3F, the originating operation can be performed also as to arbitrary special telephone numbers of one to three figures by the minimum number of operation steps (that is, the figure number of the special telephone number plus one). The concrete originating processing procedure will be explained in the succeeding clauses.

(2) Operation Procedure upon Call Origination

Figure 3:
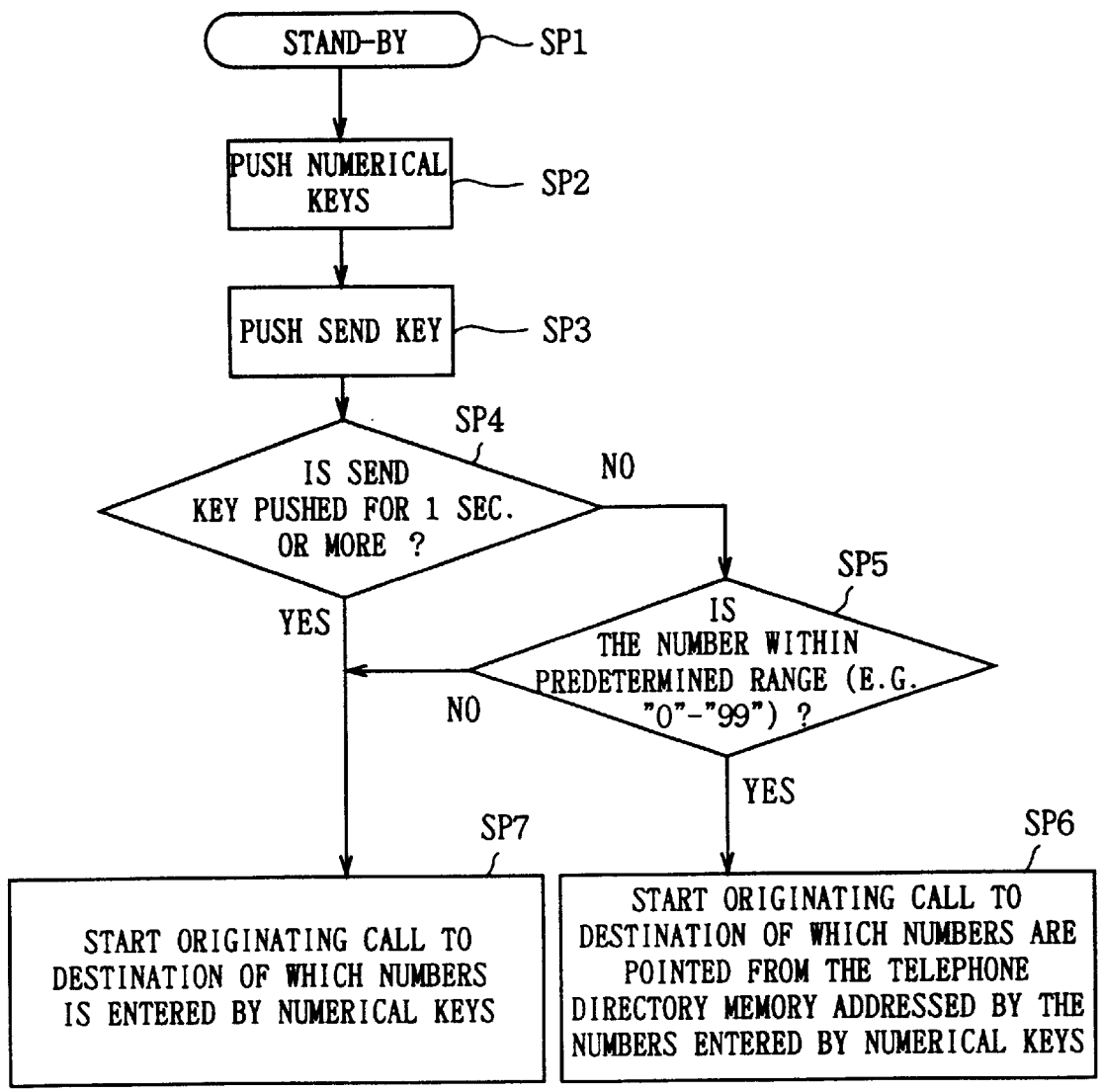
FIG. 3 is a flow chart showing an operation procedure at the time of originating a call.

In the aforesaid configuration, the operation procedure upon call origination using the portable telephone 1 according to the embodiment will be explained with reference to FIG. 3.

Firstly, the operation is started from the standby state shown in step SP1. When a user inputs a numerical sequence by using the numeral keys 3E and then depresses the send key 3F (steps SP2 to SP3), it is determined by the CPU 7 whether or not the send key 3F is depressed for a period of one second or more in step SP4.

When a negative result is obtained in step SP4 (that is, when the depression period is a short time of less than one second), the processing proceeds to step SP5, to determine whether or not the numerical sequence input just before the depression of the send key is a number in a designated range. In this embodiment, since the number in the designated range is "0" to "99", it is determined whether or not the numerical sequence input is a number in a range of "0" to "99".

When an affirmative result is obtained in step SP5 (that is, when the numerical sequence inputted is a number in the range of "0" to "99"), the processing proceeds to step SP6, and the CPU 7 reads out a telephone number of a destination from the storage address of the telephone directory memory 13 corresponding to the numerical sequence and then performs the originating operation based on the telephone number thus read.

In contrast, when an affirmative result is obtained in step SP4 (that is, when the depression period is one second or more) or when a negative result is obtained in step SP5 (that is, a number of the numerical sequence inputted is "100" or more), the processing proceeds to step SP7. In step SP7, the numerical sequence input just before the depression of the send key is regarded as a telephone number of the destination and then the originating operation is performed based on the numerical sequence. Accordingly, the originating operation can be performed also as to arbitrary special telephone numbers to which numerals of one to three figures are allotted by merely inputting a numerical sequence and depressing the send key 3F.

According to the aforesaid configuration, one of the aforesaid two call origination modes can be selected depending on the depression period of the send key 3F being depressed succeeding to the depression of the numeral keys 3E. Accordingly, when the send key 3F is depressed for a period shorter than the predetermined period after the input of a numerical sequence corresponding to a storage address, a telephone number corresponding to the storage address is read out from the telephone directory memory 13 and the originating operation is performed automatically based on the telephone number thus read. In contrast, when the send key 3F is depressed for a period not shorter than the predetermined period after the input of a numeral sequence, the originating operation is performed based on the inputted numerical sequence itself by regarding it as a telephone number of a destination.

As a consequence, the originating operation can be performed as to special telephone numbers other than the predetermined specified special telephone numbers by merely inputting a numerical sequence corresponding a telephone number of a destination and depressing the send key 3F, so that the number of operation steps required for a user can be reduced at the time of originating a call.

(3) Other Embodiments

In the aforesaid embodiment, while either the call origination based on the telephone number read from the telephone directory memory 13 or the call origination based on the input numerical sequence itself is selected depending on the depression period of the send key 3F, the present invention is not limited thereto and such a function may be allotted to other operation.

Figure 4A:
FIGS. 4A and 4B are schematic diagrams showing a method of inputting a storage address.
Figure 4B:

For example, such a selection function may be performed depending on the depression period of the numeral key 3E, an example of which is shown in FIGS. 4A and 4B. In this example, when the depression period of the numeral key is not shorter than a predetermined period, it is determined that a numerical sequence having been inputted is a numeral for designating a storage address of the telephone directory memory 13. In this case, since the telephone number of a destination stored in the telephone directory memory 13 can be read out without operating the send key 3F, the operation steps upon call origination can be reduced when compared with the aforesaid embodiment.

FIGS. 4A and 4B show a case where a numerical sequence of one to three figures is used as a storage address. FIG. 4A shows a case where a storage address "110" is designated by depressing "0" for a long time, while FIG. 4B shows a case where a storage address "1" is designated by depressing "1" for a long time.

Figure 5:
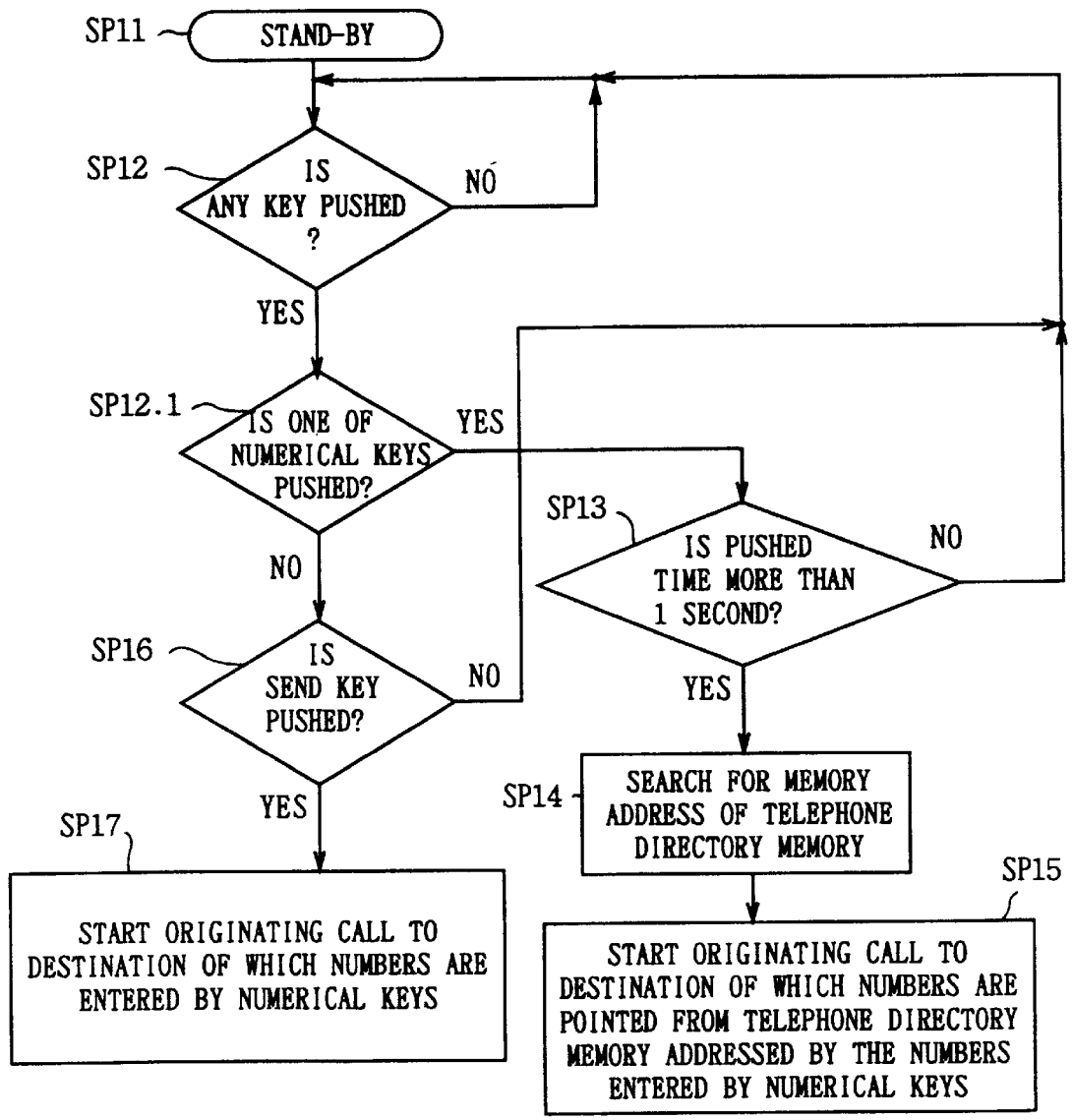
FIG. 5 is a flow chart showing an operation procedure at the time of originating a call.

FIG. 5 shows the operation procedure using such an inputting method.

Firstly, the operation is started from the standby state shown in step SP11. The CPU 7 detects that any key is depressed by means of a predetermined method (step SP12). When any key is not depressed, the processing returns to step SP12, while when any one of keys is depressed, the processing proceeds to step SP12.1. In step SP12.1, the CPU 7 determines whether or not any numerical key is depressed. When any one of numerical keys is depressed, the processing proceeds to step SP13, while when not depressed, the processing proceeds to step SP16. In step SP16, the CPU 7 determines whether or not the send key is depressed. When the send key is not depressed, the processing returns to step SP12, while when depressed, the processing proceeds to step SP17. In step SP17, the CPU 7 originates a call based on the input numerals. In contrast, when the processing proceeds to SP13 by an affirmative result was obtained in step SP12.1, the CPU 7 determines whether or not the numeral key 3E is depressed for a period of one second or more in step SP13.

When an affirmative result is obtained in step SP13 (that is, when the numeral key 3E is depressed for a period of one second or more), it is determined by the CPU 7 that the originating operation is to be performed based on the telephone number read from the telephone directory memory 13, and then the processing proceeds to a process for retrieving a storage address corresponding to the numerical sequence having been inputted (step SP14). Thereafter, a call is originated automatically to the destination based on the telephone number read from the retrieved storage address (step SP15).

On the contrary, when a negative result is obtained in step SP13 (that is, when the numeral key 3E is depressed for a short period of shorter than one second), the processing returns to step SP12, whereat the CPU 7 waits for the next numeral to be inputted.

As described above, one of the aforesaid two call origination modes can be selected depending on the depression period of the numeral key 3E in the following manner. That is, when the depression period of the numeral key is not shorter than the predetermined period, it is determined that the originating operation is to be performed based on the telephone number read from the storage address, and then a registered telephone number of a destination corresponding to the inputted numerical sequence is automatically read from the telephone directory memory to thereby perform the originating operation. Therefore, the number of operation steps required for a user can be reduced at the time of originating a call. In contrast, when the depression period of the numeral key is shorter than the predetermined period, the originating operation is performed based on the inputted numerical sequence itself in response to the depression of the send key 3F. Accordingly, in this case, the number of operations required for the originating operation as to an arbitrary special telephone number can also be reduced.

While in the aforesaid embodiments, a telephone number etc. inputted by a user is displayed on the screen of the display 4, the present invention is not limited thereto and, when such a service for displaying a telephone number of the call origination side at the time of call incoming is employed, the telephone number of the other party or the call originating side may also be displayed on the display.

Further, in the aforesaid embodiments, while the predetermined period used for selecting the origination mode is one second, the present invention is not limited thereto and the predetermined period may be shorter or longer than one second.

Further, in the aforesaid embodiments, while the storage addresses are numbers of one to two figures so as to be in a range of "0" to "99", the present invention is not limited thereto and the storage addresses may be numbers of one to three or more figures. In this case, the range of the storage address may be set freely so as to be in a rage of "0" to "199", for example.

Furthermore, in the aforesaid embodiments, while the display 4 having a function of displaying various information is mounted on the portable telephone 1, the present invention is not limited thereto and the present invention may be widely applied to a portable telephone not having such a display.

Furthermore, in the aforesaid embodiments, while the present invention is applied to the portable telephone 1, the present invention is not limited thereto and the present invention may be widely applied to an information terminal with communication function or a telephone of wired type.

As described above, according to the present invention, since either the call origination based on the telephone number read from the storage address of the telephone directory memory or the call origination based on the inputted numerical sequence itself is selected depending on the depression period of the send key having been depressed after the input of the numerical sequence by the numeral keys, it is possible to obtain a communication terminal device which is able to originate a call merely by inputting a numerical sequence and depressing the send key also as to an arbitrary special telephone number.

Further, since either the call origination based on the telephone number read from the storage address of the telephone directory memory or the call origination based on the inputted numerical sequence itself is selected depending on the depression period of the numeral key at the time of inputting a numeral, it is possible to provide a communication terminal device which is able to perform the origination operation with the reduced number of operation steps as to an arbitrary special telephone number and also to perform the origination operation based on the telephone number read from the storage address with further reduced number of operation steps.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal with keys, the communication terminal comprising:

a plurality of keys for entering information input by a user;

memory means for storing calling information including a plurality of calling numbers and abbreviated numbers corresponding to the plurality of calling numbers;

signal processing means for processing a signal for communication;

time detecting means for detecting a time duration of activation of one of the plurality of keys; and control means for controlling a communication process based on an output of the time detecting means, the control means including determining means for determining whether a number input by the user using the plurality of keys is within a predetermined range, wherein the control means determines whether the number input by the user is to be dialed as is, or whether the number input by the user represents an abbreviated number within the predetermined range, the abbreviated number corresponding to a calling number to be read out from the memory means and dialed, the control means determines that the number input by the user is to be dialed when a send key of the plurality of keys is activated for greater than a predetermined time period of about one second, the control means determines that a calling number stored in the memory means is to be dialed when the send key is activated for less than the predetermined time period and the number input by the user is determined to be within the predetermined range.

2. The communication terminal with keys according to claim 1, wherein the signal processing means includes RF signal processing means for processing a radio frequency signal and audio signal processing means for processing an audio frequency signal, and the communication terminal further comprises:
- display means for displaying communication information;
- alert generator means for generating alert information for alerting the user, and
- speaker and microphone means for generating and picking up the alert information, respectively.

3. A communication terminal with keys, the communication terminal comprising:
- a plurality of keys for entering information input by a user;
- memory means for storing calling information including a plurality of calling numbers and abbreviated numbers corresponding to the plurality of calling numbers;
- signal processing means for processing a signal for communication;
- time detecting means for detecting a time duration of activation of one of the plurality of keys; and
- control means for controlling a communication process based on an output of the time detecting means, the control means including determining means for determining whether a number input by the user using the plurality of keys is within a predetermined range, wherein the control means determines whether the number input by the user is to be dialed as is, or whether the number input by the user represents an abbreviated number within the predetermined range, the abbreviated number corresponding to a calling number to be read out from the memory means and dialed, the control means determines that the number input by the user is to be dialed when a send key of the plurality of keys is activated, and the control means determines that a calling number stored in the memory means is to be dialed when one of the plurality of keys is activated for greater than a predetermined time period of about one second.

4. A dialing method for communication, the method comprising the steps of:
- entering a number by activating numerical keys;
- entering a send command by activating a send key;
- detecting a time period of activation of the send key;
- checking whether the number entered using the numerical keys is within a predetermined range of 0 to 99 when the time period is detected to be shorter than a predetermine time period of about one second;
- originating a call to a destination by dialing the number entered by activating the numerical keys when the detected time period is longer than the predetermined time period and when the number entered by activating the numerical keys is not within the predetermined range;
- originating a call to a destination by dialing a calling number from a telephone directory memory, the calling number corresponding to the number entered by activating the numerical keys, when the number entered by activating the numerical keys is within the predetermined range.

* * * * *